(12) United States Patent
Walker et al.

(10) Patent No.: US 7,564,412 B2
(45) Date of Patent: Jul. 21, 2009

(54) ANTENNA GROUNDING SYSTEM AND METHOD

(75) Inventors: Paul N. Walker, Cypress, TX (US); Patrick R. Conway, Spring, TX (US); Kenneth D. Reddix, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 177 days.

(21) Appl. No.: 11/799,214

(22) Filed: Apr. 30, 2007

(65) Prior Publication Data

US 2008/0266198 A1   Oct. 30, 2008

(51) Int. Cl.
*H01Q 1/24* (2006.01)
(52) U.S. Cl. .................................... 343/702; 343/905
(58) Field of Classification Search .................. 343/702, 343/904, 905, 906, 846
See application file for complete search history.

(56) References Cited

U.S. PATENT DOCUMENTS

| 5,532,703 | A | * | 7/1996 | Stephens et al. ............ 343/702 |
| 5,657,029 | A | | 8/1997 | Iijima |
| 5,828,341 | A | * | 10/1998 | Delamater .................. 343/702 |
| 6,259,417 | B1 | * | 7/2001 | Kim et al. ................... 343/841 |
| 6,747,210 | B2 | * | 6/2004 | Chen ......................... 174/74 R |
| 2004/0174306 | A1 | | 9/2004 | Katoh |

* cited by examiner

*Primary Examiner*—HoangAnh T Le

(57) ABSTRACT

An antenna grounding system comprises an electronic device having at first member movably coupled to a second member, at least one cable extending between the first and second members and coupled to an antenna, and a clip having at least two fingers configured to receive the at least one cable therebetween and provide grounding for the at least one cable.

26 Claims, 3 Drawing Sheets

ANTENNA GROUNDING SYSTEM AND METHOD

BACKGROUND

Many types of electronic devices are configured having wireless communication capabilities. However, wireless signals are susceptible to noise generated from various components of the electronic device, which can further adversely affect the strength of a wireless communication signal. For example, noise generated from computer chips within a laptop computer having a wireless communication device may overpower and/or adversely affect the wireless signal, thereby causing a network connection loss.

DETAILED DESCRIPTION OF THE DRAWINGS

Figure 1:
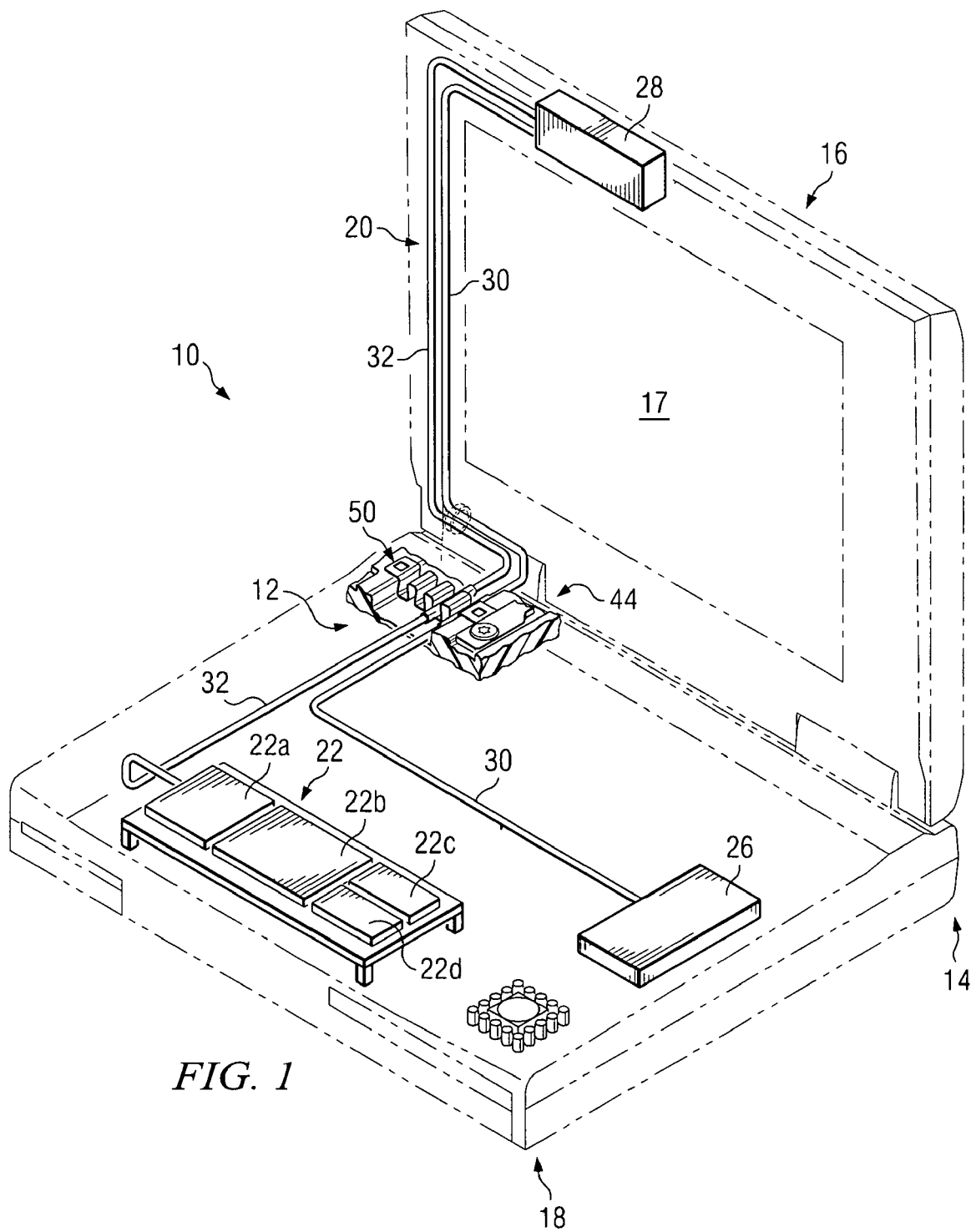
FIG. 1 is a diagram illustrating an electronic device in which an embodiment of an antenna grounding system is employed to advantage.

FIG. 1 is a diagram illustrating an electronic device 10 in which an embodiment of an antenna grounding system 12 is employed to advantage. In the embodiment illustrated in FIG. 1, electronic device 10 comprises a laptop or notebook computer device 14 comprising a display member 16 with a display screen 17 rotatably coupled to a base member 18. However, it should be understood that electronic device 10 may comprise any type of electronic device such as, but not limited to, a desktop computer, a tablet personal computer, a handheld computing device, a music player, or any other type of portable or non-portable electronic device having wireless communications capabilities.

In the embodiment illustrated in FIG. 1, electronic device 10 comprises a wireless communications assembly 20 for enabling wireless communications between electronic device 10 and a wireless communications network (e.g., wireless signals in the form of communication data and/or control signals). Antenna grounding system 12 is used to substantially reduce and/or eliminate noise or other interference (e.g., radio frequency interference, electromagnetic interference, and/or electromagnetic waves) generated by components within electronic device 10 such as, but not limited to, noise or interference caused by and/or otherwise associated with a circuit board 22 disposed within base member 18 (e.g., chips 22a, 22b, 22c and/or 22d disposed on circuit board 22) or any other noise-generating device or component disposed within electronic device 10. Wireless communications assembly 20 may be configured for a wireless wide area network (WWAN), a wireless local area network (WLAN) or any other type of wireless communications network.

In the embodiment illustrated in FIG. 1, wireless communications assembly 20 comprises at least one wireless radio or module 26 disposed in base member 18, at least one antenna 28 disposed in display member 16, and cables 30 and 32 communicatively coupling module(s) 26 to antenna(s) 28. However, it should be understood that wireless communications assembly 20 may be otherwise configured (e.g., module 26 and antenna 28 both disposed in base member 18, module 26 and antenna 28 both disposed in display member 16, etc.). in FIG. 1, two cables 30 and 32 are illustrated; however, it should be understood that a greater or fewer quantity of cables may be used for communicatively coupling antenna(s) 28 or any other type of component in display member 16 to module(s) 26 or any other type of component in base member 18. In some embodiments, cables 30 and 32 comprise coaxial cables; however, it should be understood that other types of cables 30 and 32 may be used. For example, in some embodiments, cables 30 and 32 may comprise an external braid surrounding a plurality of cable elements.

Generally, noise generated by circuit board 22, chips 22a-22d or other devices or components of electronic device 10 may interfere with and/or adversely affect the performance of wireless communications assembly 20 (e.g., the wireless signal strength). For example, noise generated by chip 22a may radiate onto cable 32 and propagate toward antenna 28, which may hinder the signal strength, thereby resulting in a network connection loss, especially when electronic device 10 is being used and/or wireless communications are being attempted near the outer edges or boundaries of a coverage area of a wireless network. Embodiments of system 12 substantially reduce and/or eliminate noise or other interference caused by components within electronic device 10 from adversely affecting the wireless communications. Embodiments of system 12 provide an intermediate conductive path to ground for cable 30 and/or 32 for re-directing all or a portion of any noise that may be radiated onto cables 30 and/or 32 away from antenna 28. For purposes herein, a ground is a direct electrical connection to a particular point in an electrical or electronic circuit, such as a chassis 44. The ground provides a point that can be considered to have zero voltage.

In the embodiment illustrated in FIG. 1, grounding system 12 comprises a clip 50 configured to provide a conductive path to ground for cables 30 and 32 while also providing a retention force to provide strain relief for cables 30 and 32 (e.g., to provide strain relief in response to movement of display member 16 relative to base member 18). In FIG. 1, clip 50 is disposed in base member 18 such that clip 50 receives cables 30 and 32 from display member 16 and provides a conductive path to ground for cables 30 and 32. However, it should be understood that clip 50 may be otherwise located (e.g., additionally or alternatively, in display member 16). In FIG. 1, two cables 30 and 32 are illustrated as extending between display member 16 and base member 18; however, it should be understood that a greater or fewer quantity of cables may extend between display member 16 and base member 18, and clip 50 may be configured to accommodate a greater or fewer quantity of cables. Further, it should be understood that clip 50 may be used to provide a conductive path to ground for one or more cables that reside solely in one of members 16 and 18 (e.g., clip 50 may be configured to be conductively coupled to a particular cable that does not extend between display member 16 and base member 18 but, instead, resides solely in one portion of electronic device 10).

Figure 2:
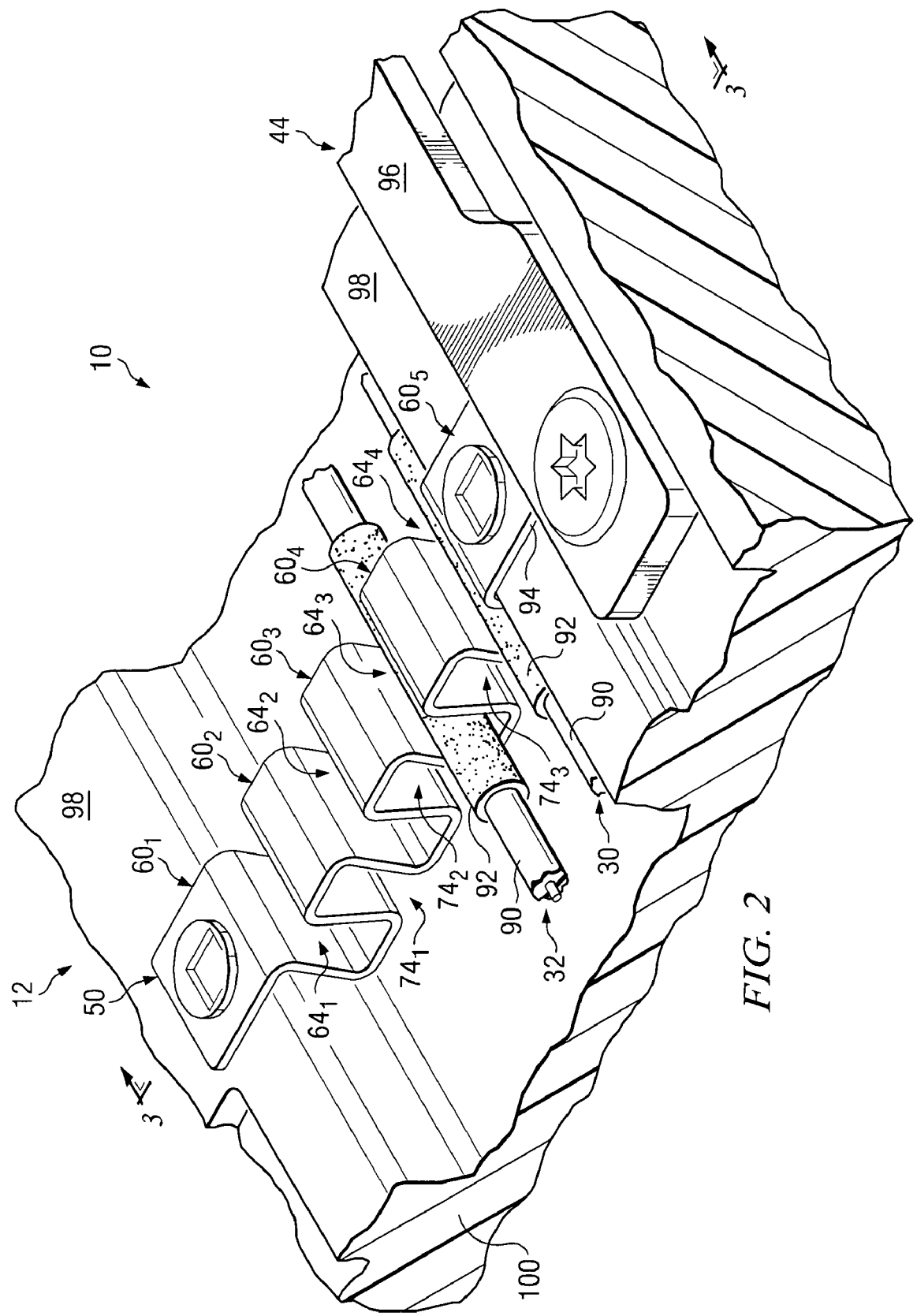
FIG. 2 is an enlarged view of the antenna grounding system of FIG. 1.
Figure 3:
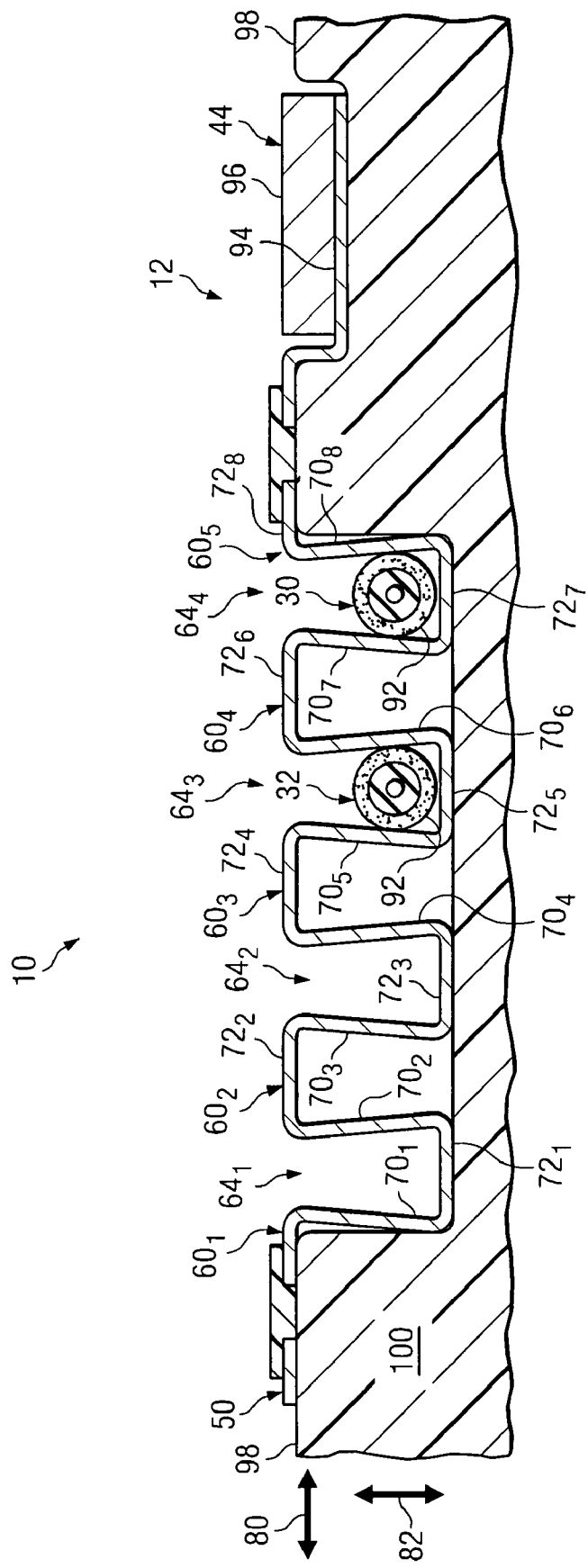
FIG. 3 is a diagram illustrating a section view of the antenna grounding system of FIGS. 1 and 2 taken along the line 3-3 of FIG. 2.

FIG. 2 is an enlarged diagram of grounding system 12, and FIG. 3 is a diagram illustrating a section view of system 12 taken along the line 3-3 of FIG. 2. In the embodiment illustrated in FIGS. 2 and 3, clip 50 comprises a number of fingers $60_1$-$60_5$ forming a number of channels $64_1$-$64_4$ therebetween for receiving cables 30 and 32 therein. It should be understood that the quantity of finger 60 and channels 64 may be varied to accommodate a greater or fewer quantity of cables. In the embodiment illustrated in FIGS. 2 and 3, fingers 60 are configured to form trapezoidal-shaped channels 64 such that fingers 60 and/or channels 64 apply a compressive retention force to cables 30 and 32 disposed within channels 64. For example, as illustrated in FIGS. 2 and 3, fingers 60 comprise a number of vertical members $70_1$-$70_8$ having a number of cross members $72_1$-$72_8$ extending therebetween. As best illustrated in FIG. 3, referring to channel $64_1$, for example, fingers $70_1$ and $70_2$ are formed having acute angles relative to cross member $72_1$ such that channel $64_1$ comprises a trapezoidal shape. Further, as illustrated in FIGS. 2 and 3, clip 50 is configured having an accordion-type shape having channels formed on opposite sides thereof (e.g., four channels $64_1$-$64_4$ on one side of clip 50 with channels $74_1$-$74_3$ formed on an opposite side thereof). Thus, in the embodiment illustrated in FIGS. 2 and 3, clip 50 is illustrated as having cables 30 and 32 disposed on one side thereof, however, it should be understood that cables may be coupled to both sides of clip 50 (e.g., disposed within channels 64 and 74).

As best illustrated in FIG. 3, cables 30 and 32 are located and/or otherwise disposed within channels 64 (e.g., $64_3$ and $64_4$). The trapezoidal shape of channels 64 applies a compressive retention force to retain cables 30 and 32 therein, thereby providing strain relief for cables 30 and 32 to resist movement of cables 30 and 32 that may otherwise result in response to movement of display member 16 relative to base member 18 (FIG. 1). Thus, for example, as best illustrated in FIG. 3, channels 64 and 74 are formed having a variable width or lateral dimension as measured in the direction indicated by arrow 80 that varies relative to the depth of channels 64 and 74 as measured in the direction indicated by arrow 82. Thus, in operation, cables 30 and 32 are installed and/or otherwise pressed into one of channels 64 and 74. Because the open portion of channels 64 and 74 is sized smaller than the base or closed portion of channels 64 and 74 (e.g., the base or closed portion of channels 64 and 74 formed by cross members 72), members 70 provide a compressive retention force to retain cables 30 and 32 therein.

In the embodiment illustrated in FIGS. 2 and 3, a portion of an outer jacket or insulator layer 90 of cables 30 and 32 is removed, thereby exposing at least a portion of cables 30 and 32 disposed beneath the insulator layer 90 (e.g., the shield layer of the cable). Embodiments of system 12 ground the portion of exposed cables 30 and 32 via clip 50 so as to substantially prevent or eliminate noise from propagating or continuing along a remaining portion of cables 30 and 32 to antenna 28.

In some embodiments, the portion of insulator layer 90 removed from cable 30 is located at an intermediate location of cables 30 and 32 in the location of clip 50 (e.g., a location of cables 30 and 32 disposed between antenna 28 and module 26 and/or circuit board 22) such that a gap or break in the insulator layer 90 is formed so that insulator layer 90 remains on cables 30 and 32 on each side of the grounded portion. Thus, for example, in the embodiment illustrated in FIGS. 2 and 3, insulator layer 90 is removed from at least a portion of cables 30 and 32 to form an exposed portion of cables 30 and 32 in the vicinity of clip 50, thereby resulting in insulator layer 90 remaining on cables 30 and 32 between clip 50 and module 26/circuit board 22 and between clip 50 and antenna 28. Insulator layer 90 is removed from an entire circumference of cables 30 and 32 to expose an underlying portion of cables 30 and 32.

In the embodiment illustrated in FIGS. 2 and 3, system 12 comprises a conductive element 92 for covering and/or grounding exposed portions of cable 30 and 32 (e.g., the portion of cables 30 and 32 where insulator layer 90 has been removed such that the removed insulator layer 90 is replaced with conductive element 92). In some embodiments, conductive element 92 comprises a conductive elastomer sleeve or tube having a hollow interior for receiving cables 30 and 32 therein (e.g., to facilitate sliding of the elastomer tube over an end of cables 30 and 32 and sliding of the elastomer tube along cables 30 and 32 to the locations of the removed insulator layer 90). However, it should be understood that conductive element 92 may be otherwise configured (e.g., a conductive element wrapped around the exposed portions of cables 30 and 32 and otherwise secured to cables 30 and 32). In some embodiments, conductive element 92 comprises a spongy/compressible conductive elastomeric material; however, it should be understood that conductive element 92 may be otherwise configured (e.g., a non-elastomeric and/or non-spongy material). In the embodiment described above, a portion of insulator layer 90 is removed from cables 30 and 32 and the exposed portions of cables 30 and 32 are grounded by conductive contact of conductive element 92 with clip 50, thereby facilitating use of an off-the-shelf coaxial or other type of cable. However, it should be understood that cables 30 and 32 may be specially manufactured having an intermediate location formed with a conductive element or portion to enable grounding of an intermediate portion of cables 30 and 32 disposed beneath the insulator layer 90. Preferably, conductive element 90 covers the exposed portion of cables 30 and 32 and extends at least slightly onto and/or over insulator layer 90 remaining on cables 30 and 32.

In the embodiment illustrated in FIGS. 2 and 3, conductive element 92 is disposed in contact with clip 50, and clip 50 is conductively coupled to a portion of chassis 44 for grounding thereof. For example, in the embodiment illustrated in FIGS. 2 and 3, a portion 94 of clip 50 is conductively coupled to a portion of a hinge assembly 96 of electronic device 10 to provide a conductive path to ground. However, it should be understood that clip 50 may be conductively coupled to another portion of chassis 44 and/or elsewhere on electronic device 10. Clip 50 may be formed from copper, a copper alloy, or other type of conductive material. In the embodiment illustrated in FIGS. 2 and 3, clip 50 is coupled to one or more portions of a housing or other structure of electronic device 10. For example, in the embodiment illustrated in FIGS. 2 and 3, clip 50 is coupled to a keyboard deck portion 98 of a housing 100 of electronic device 10. However, it should be understood that clip 50 may be coupled to different portions/locations of electronic device 10. In some embodiments, clip 50 is heat-staked or fused to housing 100 (e.g., using pins that are designed to melt and hold clip 50 to housing 100 and/or otherwise melting/fusing clip 50 to housing 100). However, it should be understood that clips, fasteners, or other types of devices or method may be used to secure clip 50 to electronic device 10.

Thus, embodiments of system 12 enable electronic device 10 to be manufactured such that clip 50 provides a conductive path to ground for cables associated with and/or otherwise connected to an antenna used for wireless communications for electronic device 10. Embodiments of system 12 also enable clip 50 to be manufactured to provide a retention force to cables attached and/or coupled thereto to resist movement of cables that may otherwise result from the movement of various components of electronic device 10. Thus, in some embodiments, electronic device 10 may be manufactured by movably coupling a first member to a second member, coupling at least one cable extending between the first and second members to an antenna, and conductively coupling a portion of the at least one cable to a clip, the clip having at least two fingers configured to receive the at least one cable therebetween. Electronic device 10 may also be manufactured by configuring the clip to apply a compressive retention force to the at least one cable. In some embodiment, electronic device 10 may be manufactured by conductively coupling the clip to a chassis of the electronic device, providing a grounding sleeve on at least a portion of the at least one cable, and locating the grounding sleeve between the at least two fingers of the clip. Embodiments of electronic device 10 may also be manufactured by providing a clip configured to receive at least one cable from an antenna, wherein the clip provides grounding for the at least one cable, and wherein the clip comprises at least one trapezoidal-shaped channel for receiving the at least one cable therein. Embodiments of electronic device 10 may also be manufactured by configuring the at least one trapezoidal-shaped channel to apply a retention force to the at least one cable. Embodiments of electronic device 10 may further be manufactured by conductively coupling the clip to a chassis of the electronic device, providing a grounding sleeve on at least a portion of the at least one cable, and locating the grounding sleeve in the at least one trapezoidal-shaped channel.

What is claimed is:

1. A computer, comprising:
   a base;
   a display coupled to the base; and
   a wireless communication assembly that includes an antenna connected to the display, a wireless radio located in the base, a cable extending between the antenna and the wireless radio, and a clip located between the antenna and the wireless radio, the clip providing a conductive path to ground for the cable to reduce noise caused by electrical components in the computer.

2. The computer of claim 1, wherein the clip redirects the noise away from the antenna and to the ground.

3. The computer of claim 1, wherein clip is located in the base and includes two fingers that form a channel that receives the cable.

4. The computer of claim 1, wherein a portion of an insulator layer around the cable is removed and replaced with a conductive member at a location where the cable connects to the clip.

5. The computer of claim 1, wherein the clip has at least two fingers that form a trapezoidal-shaped channel for receiving the cable therein.

6. The computer of claim 1, wherein the cable comprises a grounding sleeve at a location where the cable contacts the clip.

7. The computer of claim 1, wherein the cable includes an insulator layer and a portion of the insulator layer is removed to provide a gap where the cable contacts the clip.

8. The computer of claim 1, wherein the cable includes a conductive element around an exterior of the cable to provide an electrical pathway for the noise to the ground.

9. The computer of claim 1, wherein the clip has two fingers that provide a channel that retains the cable, and the cable includes an outer grounding sleeve disposed in the channel.

10. An electronic device, comprising:
    an antenna;
    a wireless module connected to the antenna with a first cable;
    a circuit board connected to the antenna with a second cable; and
    a clip retaining the first and second cables and located between the antenna and the wireless module and between the antenna and the circuit board, wherein the clip provides a conductive path to ground for the first and second cables to reduce noise generated by the circuit board.

11. The electronic device of claim 10, wherein the clip has two trapezoidal-shaped channels that apply a retention force to the first and second cables.

12. The electronic device of claim 10, wherein the first and second cables each include a grounding sleeve located where the clip contacts the first and second cables.

13. The electronic device of claim 10, wherein the electronic device comprises a notebook computer.

14. The electronic device of claim 10, wherein the clip prevents the noise from propagating along the first and second cables to the antenna.

15. The electronic device of claim 10, wherein the first and second cables include a compressible conductive elastomeric material where the first and second cables contact the clip.

16. The electronic device of claim 10, wherein the clip has two channels with an open end of the channels sized smaller than a closed end of the channels to form a trapezoidal shape.

17. A method for manufacturing an electronic device, comprising:
    movably coupling a first member to a second member;
    coupling at least one cable extending between the first and second members to an antenna;
    conductively coupling a portion of the at least one cable to a clip, the clip having at least two fingers configured to receive the at least one cable therebetween; and
    providing a conductive path to ground through the clip for the at least one cable to reduce noise caused by electrical components in the electronic device.

18. The method of claim 17, comprising configuring the clip to apply a compressive retention force to the at least one cable.

19. The method of claim 17, further comprising conductively coupling the clip to a chassis of the electronic device.

20. The method of claim 17, further comprising providing a grounding sleeve on at least a portion of the at least one cable at a location where the clip contacts the at least one cable.

21. The method of claim 20, further comprising locating the grounding sleeve between the at least two fingers of the clip.

22. A method for manufacturing an electronic device, comprising:
    providing a clip configured to receive at least one cable from an antenna, wherein the clip provides grounding for the at least one cable, and wherein the clip comprises at least one trapezoidal-shaped channel for receiving the at least one cable therein; and
    providing a conductive path to ground through the clip for the at least one cable to reduce noise caused by electrical components in the electronic device.

23. The method of claim 22, further comprising configuring the at least one trapezoidal-shaped channel to apply a retention force to the at least one cable.

24. The method of claim 22, further comprising conductively coupling the clip to a chassis of the electronic device.

25. The method of claim 22, further comprising providing a grounding sleeve on at least a portion of the at least one cable.

26. The method of claim 22, further comprising locating the grounding sleeve in the at least one trapezoidal-shaped channel.

* * * * *

UNITED STATES PATENT AND TRADEMARK OFFICE
CERTIFICATE OF CORRECTION

| | | |
|---|---|---|
| PATENT NO. | : 7,564,412 B2 | Page 1 of 1 |
| APPLICATION NO. | : 11/799214 | |
| DATED | : July 21, 2009 | |
| INVENTOR(S) | : Paul N. Walker et al. | |

It is certified that error appears in the above-identified patent and that said Letters Patent is hereby corrected as shown below:

In column 6, line 30, in Claim 18, after "claim 17," insert -- further --.

Signed and Sealed this

Seventeenth Day of November, 2009

David J. Kappos
*Director of the United States Patent and Trademark Office*